(No Model.)
G. R. A. WEIMANN.
PROCESS OF EMBOSSING PHOTOGRAPHS.
No. 576,640. Patented Feb. 9, 1897.
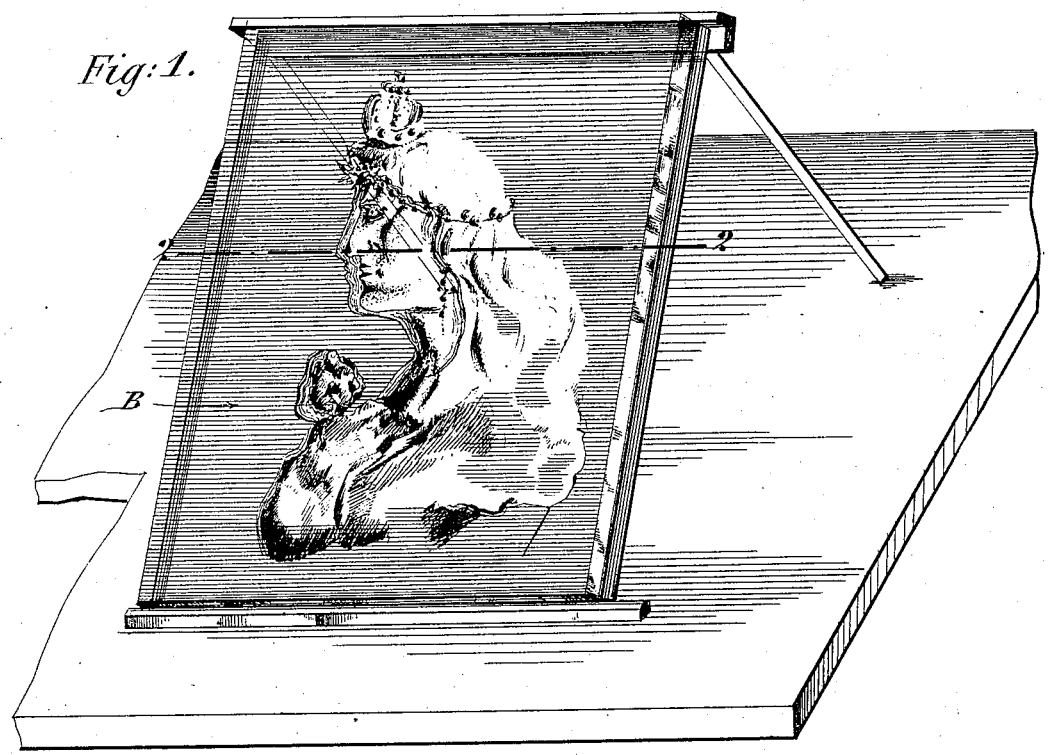
Fig: 1.
Fig: 2.
Fig: 3.
Fig: 4.
Fig: 5.

UNITED STATES PATENT OFFICE.

GUSTAV R. A. WEIMANN, OF BROOKLYN, NEW YORK.

PROCESS OF EMBOSSING PHOTOGRAPHS.

SPECIFICATION forming part of Letters Patent No. 576,640, dated February 9, 1897.

Application filed May 1, 1896. Serial No. 589,878. (No specimens.)

*To all whom it may concern:*

Be it known that I, GUSTAV R. A. WEIMANN, a citizen of the Empire of Germany, residing at Brooklyn, in the county of Kings and State of New York, have invented certain new and useful Improvements in Processes of Embossing Photographs and other Pictures, of which the following is a specification.

This invention relates to an improved method of embossing photographs, drawings, or other pictures, so that an approach to the actual shape of the objects shown in the picture is brought out alto-rilievo or intaglio, and thus a more effective and artistic picture is obtained; and the invention consists of a process of embossing photographs or other pictures by placing a translucent plate of suitable carvable material over the negative of the picture, and then carving the objects shown in the picture in intaglio on the surface of the translucent plate, next making a mold from said carved plate, then moistening the photograph or other pictures and embossing it in the mold by pressure.

My improved method of embossing photographs and other pictures is illustrated in the accompanying drawings, in which—

Figure 1 is a perspective view of a photographic negative with the translucent plate placed over the same. Fig. 2 is a vertical transverse section on line 2 2, Fig. 1, of the translucent plate after the carving on the latter is perfected. Fig. 3 is a vertical section showing the taking of a plaster-of-paris mold from the carved translucent plate. Fig. 4 is a vertical section showing the taking of a metallic mold from the plaster-of-paris mold, and Fig. 5 is a vertical section of a positive photographic or other reproduction of the picture to be embossed and the metallic embossing-mold.

Similar letters of reference indicate corresponding parts.

In carrying out my improved process of embossing photographs and other pictures the photographic negative A is covered with a plate of suitable translucent material B fit to be carved, such as a gelatin or glycerin composition or similar plastic material. The negative is lighted from below, either by sunlight or artificial light, &c., so that the lights and shades of the picture can be clearly seen. The translucent plate is then carved in intaglio by approaching the actual shape and outline of the objects represented on the negative, which is accomplished with little practice by any one experienced in wood cutting or engraving, as the material is easily carvable, and the objects represented by the picture are visible through the plate until a plastic representation of the picture is produced. From the intaglio thus obtained a plaster-of-paris mold C in alto-rilievo is taken, as shown in Fig. 3, from which a metallic mold D is made in intaglio, as shown in Fig. 4. The latter mold is used for embossing the photograph or other picture, which is preferably made on somewhat spongy paper and moistened before being applied to the mold. The photograph or other picture E to be embossed is gently pressed face downward into the mold, so as to assume the shape of the same, after which it is permitted to dry in the mold, as shown in Fig. 5. When dry, the embossed picture is removed from the mold and mounted in any approved manner.

In place of using a negative for carving the translucent plate the latter can also be made from the positive photograph or picture, in which case the translucent carvable plate is placed over the picture and carved in alto-rilievo by approaching the actual outlines of the picture, and the alto-rilievo thus obtained is used for making a plaster-of-paris mold, from which a metallic mold is made in alto-rilievo and a second one in intaglio, on which latter the moistened photograph or other picture is placed face downward and gently pressed, so that the embossed picture thus obtained approaches the actual shape of the objects represented in the picture.

The main advantage of my improved method of embossing photographs and other pictures is that the picture is always before the eyes of the carver, so that consequently the more the carving proceeds the better the carver is enabled to work out the details of the same, as he can always compare his work with the original below the translucent plate. A very superior mold can thus be produced from the carved plate, from which embossed pictures of striking quality and naturalness are obtained. Any suitable composition can be used for this purpose.

I do not claim, broadly, the embossing of pictures by means of a mold or die, as this has been well known heretofore.

Having thus described my invention, I claim as new and desire to secure by Letters Patent—

1. The process herein described of embossing photographs or other pictures, which consists in placing a translucent carvable plate over a negative or positive of a picture, carving on the translucent plate an approach to the actual shape of the objects represented in the picture, making a mold from said obtained carving, and pressing a positive photographic or other reproduction of said picture into said mold so as to emboss the same, substantially as set forth.

2. The process herein described of embossing photographs or other pictures, which consists in placing a translucent carvable plate over a negative or positive of a picture to be embossed, carving into the surface of the plate an approach to the actual shape of the objects represented in the picture, making a mold from said carved plate, moistening a positive photographic or other reproduction of the picture to be embossed, pressing it into the mold, drying it while in the mold, and lastly, mounting the embossed picture, substantially as set forth.

In testimony that I claim the foregoing as my invention I have signed my name in presence of two subscribing witnesses.

G. R. A. WEIMANN.

Witnesses:
PAUL GOEPEL,
GEO. W. JAEKEL.